(12) United States Patent
Bao

(10) Patent No.: US 11,570,288 B2
(45) Date of Patent: Jan. 31, 2023

(54) DECORATIVE RING, FUNCTIONAL MODULE AND MOBILE TERMINAL

(71) Applicant: GUANGDONG OPPO MOBILE TELECOMMUNICATIONS CORP., LTD., Guangdong (CN)

(72) Inventor: Xiaoming Bao, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 399 days.

(21) Appl. No.: 16/707,022

(22) Filed: Dec. 9, 2019

(65) Prior Publication Data

US 2020/0186630 A1 Jun. 11, 2020

(30) Foreign Application Priority Data

Dec. 7, 2018 (CN) .......................... 201822050184.9

(51) Int. Cl.
*H04N 5/225* (2006.01)
*H04M 1/02* (2006.01)

(52) U.S. Cl.
CPC ........ *H04M 1/0264* (2013.01); *H04N 5/2252* (2013.01); *H04N 5/2256* (2013.01)

(58) Field of Classification Search
CPC ...... H04M 1/0264; H04M 1/026; H04M 1/22; H04M 1/0283; H04N 5/2252; H04N 5/2256

See application file for complete search history.

(56) References Cited

U.S. PATENT DOCUMENTS

2015/0199029 A1* 7/2015 Kim ...................... G06F 1/1662
    345/169
2018/0007243 A1* 1/2018 Maatta ................. H04N 5/2257

FOREIGN PATENT DOCUMENTS

| CN | 107370849 A | 11/2017 |
|---|---|---|
| CN | 206674016 U | 11/2017 |
| CN | 107454221 A | 12/2017 |
| CN | 107645626 A | 1/2018 |
| CN | 206922892 U | 1/2018 |
| CN | 206023858 U | 6/2018 |
| CN | 207504996 U | 6/2018 |
| CN | 108769465 A | 11/2018 |
| CN | 209572071 U | 11/2019 |

(Continued)

OTHER PUBLICATIONS

The international search report for the PCT application No. PCT/CN2019/123062, dated Feb. 27, 2020.

(Continued)

*Primary Examiner* — Mekonnen D Dagnew

(57) ABSTRACT

Some embodiments of the present disclosure relate to a decorative ring, a functional module and a mobile terminal. The decorative ring includes a body portion, a sidewall portion and a light guide portion, wherein the sidewall portion encloses a peripheral side of the body portion to form a accommodating region, and the accommodating region is configured to accommodate a part of the camera module; and the decorative ring has an inner face and outer face opposite the inner face, the inner face defines the accommodating region, and the light guide portion enables light to transmit from the side where the inner face positioned to the side where the outer face positioned.

19 Claims, 2 Drawing Sheets

(56) References Cited

FOREIGN PATENT DOCUMENTS

| JP | 3941742 B2 | 7/2007 |
| JP | 2013118175 A | 6/2013 |
| JP | 5279011 B2 | 9/2013 |

OTHER PUBLICATIONS

The extended European search report for EP patent application No. 19213749.5, dated Feb. 25, 2020.
The first examination report for the corresponding IN patent application No. 201914050403, dated Jan. 29, 2021.
First Office Action of the Indian application No. 201917024823, dated Jan. 21, 2021.

* cited by examiner

DECORATIVE RING, FUNCTIONAL MODULE AND MOBILE TERMINAL

CROSS-REFERENCE TO RELATED APPLICATION(S)

The present disclosure claims priority to Chinese Patent Application No. 201822050184.9, filed on Dec. 7, 2018 and entitled "Decorative Ring, Functional Module and Mobile Terminal", the contents of which are hereby incorporated by reference in its entirety.

TECHNICAL FIELD

The present disclosure relates to a technical field of mobile terminals, and more particularly to a decorative ring, a functional module and a mobile terminal.

BACKGROUND

Along with popularization of mobile terminals such as mobile phones and tablet computers, mobile terminal has become an indispensable part of people's work and lives. A user not only requires a simple communication function of a mobile terminal, but also pays more attention to a user experience of the mobile terminal. However, a decorative member of a related mobile terminal has an ordinary decorative effect, usage scenarios may not be enriched, and a user experience needs to be further improved.

SUMMARY

In an aspect of the present disclosure, a decorative ring is provided, which includes a body portion, a sidewall portion and a light guide portion, wherein the sidewall portion encloses a peripheral side of the body portion to define an accommodating region, and the accommodating region is configured to accommodate a part of a camera module; the decorative ring has an inner face and an outer face opposite the inner face, the inner face defines the accommodating region, and the light guide portion enables light to transmit from a side where the inner face positioned to a side where the outer face positioned.

In another aspect of the present disclosure, a functional module is provided, which includes a decorative ring including a body portion, a sidewall portion and a light guide portion, wherein the sidewall portion encloses a peripheral side of the body portion to define an accommodating region, and the accommodating region is configured to accommodate a part of a camera module; the decorative ring has an inner face and an outer face opposite the inner face, the inner face defines the accommodating region; and a camera module arranged at the accommodating region.

In an additional aspect of the present disclosure, a mobile terminal is provided, which includes a functional module including a decorative ring comprising a body portion, a sidewall portion and a light guide portion, wherein the sidewall portion encloses a peripheral side of the body portion to define an accommodating region, and the accommodating region is configured to accommodate a part of a camera module; the decorative ring has an inner face and an outer face opposite the inner face, the inner face defines the accommodating region; and a camera module arranged at the accommodating region; and a shell coupled to the functional module, and at least a part of the light guide portion exposes from the shell so as to enable light to emit from the mobile terminal via the light guide portion.

BRIEF DESCRIPTION OF THE DRAWING

In order to describe the technical solutions in embodiments of the disclosure or a conventional art more clearly, the drawings required to be used for descriptions about the embodiments or the conventional art will be simply introduced below. It is apparent that the drawings described below are only some embodiments of the disclosure. Those of ordinary skill in the art may further obtain other drawings according to these drawings without creative work.

DETAILED DESCRIPTION OF THE EMBODIMENTS

Figure 1:
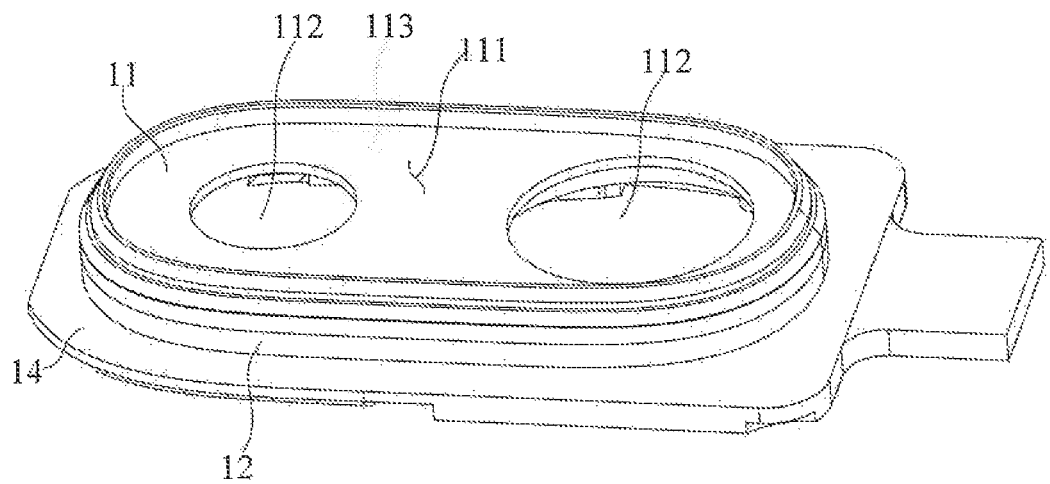
FIG. 1 is a structure diagram of a decorative ring according to an embodiment.

For conveniently understanding the disclosure, the disclosure will be described below more comprehensively with reference to related drawings. The preferred embodiments of the disclosure are shown in the drawings. However, the disclosure may be implemented in many different forms and is not limited to the embodiments described herein. Instead, these embodiments are provided to make the contents disclosed in the disclosure more thoroughly and comprehensively.

"Terminal device" used here includes, but not limited to, a device connected in any one or more of the following connection manners and capable of receiving and/or sending a communication signal:

(1) a wired connection manner, for example, a Public Switched Telephone Network (PSTN), a Digital Subscriber Line (DSL), a digital cable and direct cable connection; and (2) a wireless interface manner, for example, a cellular network, a Wireless Local Area Network (WLAN), a digital television network like a Digital Video Broadcasting Handheld (DVB-H) network, a satellite network and an Amplitude Modulation (AM)-Frequency Modulation (FM) broadcast transmitter.

A terminal device configured to communicate by a wireless interface may be called a "decorative ring". Examples of the decorative ring include, but not limited to, the following decorative rings:

(1) a satellite phone or a cell phone;

(2) a Personal Communication System (PCS) terminal capable of integrating a cellular radio phone and data processing, faxing and data communication capabilities;

(3) a radio phone, a pager, Internet/intranet access, a Web browser, a memo pad, a calendar and a Personal Digital Assistant (PDA) equipped with a Global Positioning System (GPS) receiver;

(4) a conventional laptop and/or palmtop receiver; and (5) a conventional laptop and/or palmtop radio phone transceiver and the like.

Figure 6:
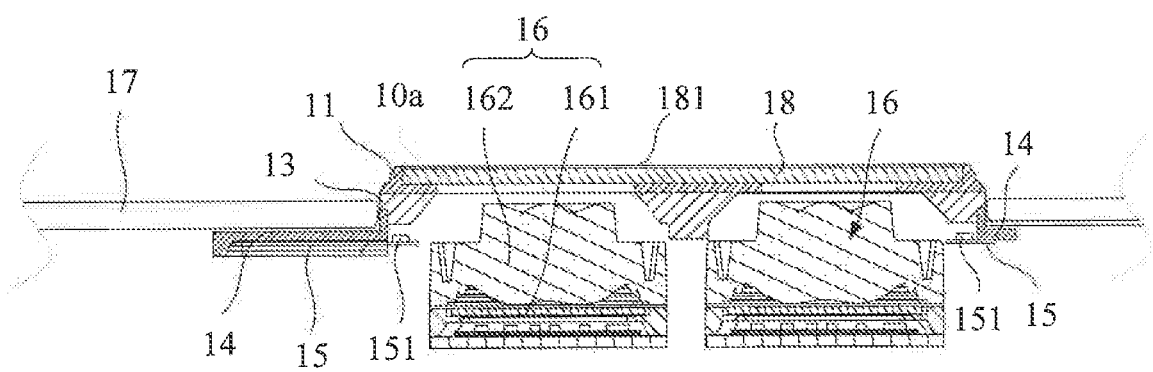
FIG. 6 is a partial sectional view when a house and a functional module of a mobile terminal are assembled according to an implementation mode.

As shown in FIG. 1, an embodiment of the present disclosure provides a decorative ring 10, which is configured for accommodating a camera module, namely serving as a mounting carrier of the camera module to enhance stability of a mounting structure, and may also achieve a decorative effect to make the camera module with relatively aesthetic. Wherein, the camera module includes a camera assembly 16. In combination with FIG. 1 to FIG. 3, the decorative ring 10 includes a body portion 11, a sidewall portion 12 and a light guide portion 13, and the sidewall portion 12 encloses a peripheral side of the body portion 11 to define an accommodating region 10a. That is, when the sidewall portion 12 encloses the peripheral side of the body portion 11, a relatively recess portion, i.e., the receiving portion 10a, is formed, as shown in FIG. 6, and the accommodating region 10a is configured to accommodate the camera assembly 16, and may only accommodate a part of the camera assembly 16. For example, in an implementation mode, when the camera assembly 16 is arranged at the decorative ring 10, a part of the camera assembly 16 is accommodated in the accommodating region 10a, and furthermore, when the camera assembly 16 is applied to a mobile terminal such as a mobile phone and a tablet computer, an accommodating space of the accommodating region 10a is enlarged in a manner of arranging the decorative ring 10 outside the mobile terminal, thereby properly reducing an arrangement space, occupied by the camera assembly 16, of the mobile terminal and ensuring that the other part of the mobile terminal may be arranged to be relatively thin to achieve a light and thin design.

Figure 4:
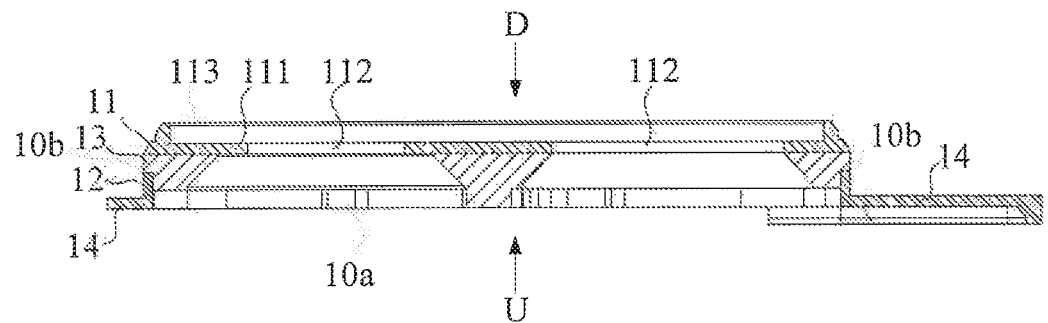
FIG. 4 is a sectional structure diagram of a decorative ring according to an implementation mode.

In combination with FIG. 4 and FIG. 6, the decorative ring 10 has an inner surface and an outer surface faced opposite the inner surface. For the decorative ring 10 with the accommodating region 10a, the inner surface is a side surface, configured to define the accommodating region 10a, of the decorative ring 10, i.e., a surface observable when the decorative ring is observed from the side where the accommodating region 10a positioned. As shown in FIG. 4, during observation from a direction of an arrowhead U, the inner surface is observed; and correspondingly, during observation from a direction of an arrowhead D, the outer surface is observed. In the embodiment, the light guide portion 13 enables light to transmit from a side where the inner surface positioned to a side where the outer surface positioned. That is, light is get incident to the other side from the side, where the camera assembly 16 is arranged, of the decorative ring 10. Therefore, by use of the decorative ring 10, a requirement on achievement of a relatively good light effect outside the camera assembly 16 can be met to improve a user experience. For example, in case of lighting from the side where the inner surface of the decorative ring 10 positioned, light is transmitted to the side where the outer surface positioned via the light guide portion 13, thereby achieving a light effect.

In some exemplary embodiment, the light guide portion 13 is annular and extends along a peripheral side of the sidewall portion 12. In such an arrangement manner, light can be annularly emitted from the side where the outer surface positioned via the light guide portion 13 to achieve an annular light effect.

In some exemplary embodiment, the body portion 11 or the sidewall portion 12 is provided with a through hole 10b, the through hole 10b is defined by hollowing the inner surface and the outer surface out, and the through hole 10b is filled with a part of the light guide portion 13, so that the light guide portion 13 enables light to transmit from the side where the inner surface positioned to the side where the outer surface positioned, so as to achieve a relatively good light effect outside the decorative ring 10. In the embodiments, the through hole 10 is filled with a part of the light guide portion 13 in a filling manner, so that a light transmission requirement can be met on one hand; and on the other hand, in such a filling manner, a bonding force between the light guide portion 13 and the body portion 11 or the sidewall portion 12 can be increased to avoid a phenomenon that the light guide portion 13 is likely to loosen to affect a light guide effect.

In some exemplary embodiments, the light guide portion 13 is integrally formed at the body portion 11 or the sidewall portion 12. In such a structural form, bonding strength there between is strengthened to avoid them being loosened and further separated; and in addition, influence of formation of an obvious gap at a junction of them on appearance integrity of the decorative ring 10 can also be avoided. In other exemplary embodiments, A metal material such as stainless steel or an aluminum alloy is adopted as materials of the body portion 11, the sidewall portion 12 and the light guide portion, to provide relatively strong structural strength. One of polymethyl methacrylate (PMMA), polystyrene (PS) and polycarbonate (PC) may be selected as a material of the light guide portion 13, to achieve a relatively good light transmission effect.

Descriptions will be made below with disclosure of the decorative ring 10 to a mobile terminal such as a mobile phone and a tablet computer as an example.

Figure 5:
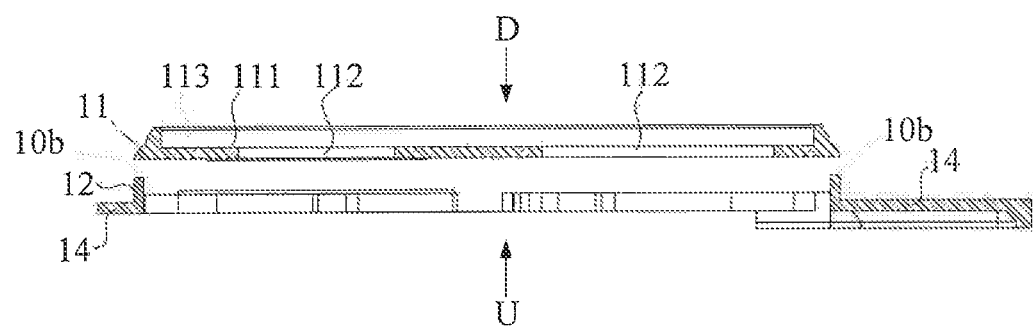
FIG. 5 is a partial sectional view of the decorative ring shown in FIG. 4 when a light guide portion is removed.

For example, in an exemplary embodiment, in combination with FIG. 4 to FIG. 6, the embodiment provides a mobile terminal, which includes a shell 17 and a functional module. The functional module includes a camera assembly 16 and a decorative ring 10 for accommodating the camera assembly 16. Wherein, the structure of the decorative ring 10 may adopt the abovementioned structural form, so that, when the decorative ring 10 is configured to accommodate the camera assembly 16, the decorative ring 10 may meet a requirement that light is emitted to achieve a light effect outside the camera assembly 16. For example, in the functional module, the camera assembly 16 is accommodated at an accommodating region 10a. Since the accommodating region 10a is defined by an inner surface, when a light guide portion 13 enables light to transmit from the side where the inner surface positioned to the side where an outer surface positioned, a light effect can be achieved outside the camera assembly 16 to provide a relatively good user experience.

In an exemplary embodiment that the light guide portion 13 is annular and extends along the peripheral side of the sidewall portion 12, since the light guided out by the light guide portion 13 can achieve an annular light effect, when the camera assembly 16 is arranged at the accommodating region 10a, a cool effect is achieved around the camera assembly 16 by use of the annular light effect achieved by the light guide portion 13. In an exemplary embodiment, the annular light effect may be a regular circular ring, and may also be an elliptical ring. In other exemplary embodiments, the annular light effect may also be an irregular ring. It can be understood that a form of the light effect achieved by the light transmitted by the light guide portion 13 depends on a contour formed by extension of the light guide portion 13 along the peripheral side of the sidewall portion 12. In other words, when the light guide portion 13 circularly surrounds the sidewall portion 12, the light effect achieved by the emitted light can substantially be a circular ring.

In some exemplary embodiment, after the functional module is coupled to the shell 17, a part of the light guide portion 13 exposes from the shell 17 such that light is emitted from the mobile terminal via the light guide portion 13, so as to meet the requirement that the light guide portion 13 emits the light. For example, in some cases, when the mobile terminal plays music, the light guide portion 13 of the decorative ring 10 emits light to achieve a light effect to achieve a lighting effect. In some cases, a color of the emitted light can be controlled to achieve different lighting effects. For example, in a music playing process, a flickering frequency or color of light may be regulated according to a music rhythm to achieve a cool light effect. In some other embodiments, when the camera assembly 16 is enabled for shooting, the light guide portion 13 enables light to transmit to achieve a corresponding light effect and further improve the user experience. It is to be noted that the light incident to the light guide portion 13 and emitted from the side where the outer surface positioned to achieve the light effect may be from a light source assembly outside the functional module. For example, the light source assembly may be arranged in the shell 17 of the mobile terminal. In such case, it is only required to be ensured that, when the functional module is arranged in the mobile terminal, light emitted via the light source assembly is transmitted, via the light guide portion 13, out of the mobile terminal.

In other embodiments, the light source assembly may also be directly in the functional module such that, when the functional module is assembled to the mobile terminal, the light source assembly may be loaded into the mobile terminal together with the camera assembly 16 and the decorative ring 10 to simplify an assembling procedure and improve assembling efficiency.

Descriptions will be made below with the condition that the functional module includes the light source assembly as an example.

In some embodiments, the functional module includes the light source assembly, the light source assembly is arranged on the side where the inner surface of the decorative ring 10 positioned, and light emitted via the light source assembly can be transmitted to the side where the outer surface positioned via the light guide portion 13. Arrangement of the light source assembly on the side where the inner surface of the decorative ring 10 positioned refers to that, when the functional module is assembled to the mobile terminal, the light source assembly emits the light in the mobile terminal. Since a part of the light guide portion 13 exposes from the shell 17, the light guide portion 13 enables light emitted by the light source assembly to transmit to the side where the outer surface positioned, a light effect can be achieved outside the mobile terminal.

Figure 3:
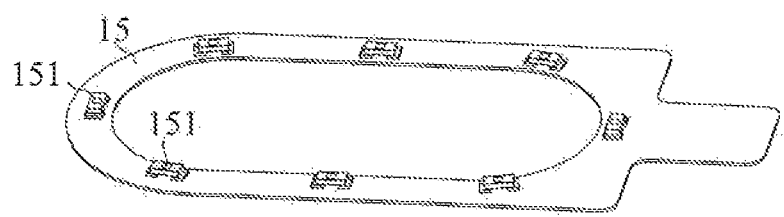
FIG. 3 is a structure diagram of a circuit board of a functional module according to an implementation mode.

In combination with FIG. 3 to FIG. 5, in an exemplary embodiment, the light source assembly includes a circuit board 15 and an LED lamp 151 arranged on the circuit board 15, the circuit board 15 is coupled to a side having a larger distance to the body portion 11 of the sidewall portion 12, and the LED lamp 151 is opposite the light guide portion 13. In such an arrangement manner, an arrangement manner for the LED lamp 151 is simplified, and is implemented only by connecting the circuit board 15 with the decorative ring 10. The circuit board 15 may be adhered to the sidewall portion 12 through glue. Compared with a manner of connection via a bolt, a screw and the like, this manner has the advantages that an internal arrangement space of the mobile terminal is saved more to facilitate light and thin design of the mobile terminal.

Figure 2:
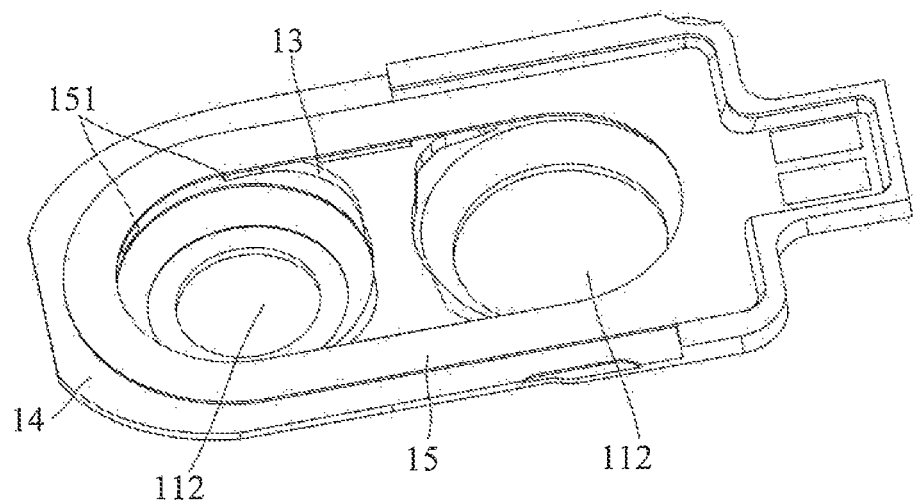
FIG. 2 is a fitting schematic diagram of a decorative ring and a circuit board of a functional module according to an implementation mode.

In some exemplary embodiment, in combination with FIG. 2, FIG. 3 and FIG. 6, the circuit board 15 is annular and extends along a peripheral side of the sidewall portion 12, the circuit board 15 is arranged surrounding the camera assembly 16, and a plurality of LED lamps 151 is arranged in a surrounding direction of the circuit board 15. In such an arrangement manner, light emission uniformity of the light guide portion 13 along the peripheral side of the sidewall portion 12 can be improved, and the light effect is relatively uniform. When the LED lamps 151 are arranged, the plurality of LED lamps 151 is uniformly distributed in the surrounding direction of the circuit board 15, thereby form relatively uniform annular light.

In some exemplary embodiment, the decorative ring 10 can meet the requirement that the external light is incident to the camera assembly 16 to ensure that the camera component 16 can normally execute a shooting function. As shown in FIG. 4 and FIG. 5, the body portion 11 of the decorative ring 10 is platy and has a first surface and second surface 111 opposite the first surface, the first surface forms a part of the inner surface, the second surface 111 forms a part of the outer surface, and the body portion 11 is provided with a light transmission opening 112 through the first surface and the second surface 111. Therefore, by use of the light transmission opening 112, the external light can be incident to the side where the first surface positioned, and the camera assembly 16 accommodated at the accommodating region 10a can receive the external light for adaptation to the shooting requirement. In combination with FIG. 6, the camera assembly 16 includes an inductive sensor 161 and a lens group 162, and the light transmission opening 112 enables external light to transmit through and get incident to the inductive sensor 161 via the lens group 162.

There may be multiple camera assemblies 16. For example, in an exemplary embodiment shown in FIG. 6, the decorative ring 10 is provided with two camera assemblies 16. The body portion 11 is provided with a corresponding number of light transmission openings 112 such that light enters the corresponding camera assemblies 16 to meet the shooting requirement.

In some exemplary embodiments, in combination with FIG. 4 and FIG. 6, the decorative ring 10 includes a camera lens 18, the camera lens 18 has an incident surface 181 and enables light to get incident to the camera component 16 from the incident surface 181.

The body portion 11 is provided with a recess region 113 on the side where the second surface 111 positioned, and the camera lens 18 is embedded into the recess region 113, so that the lens group 162 may be covered by the camera lens 18 to protect the lens group 162. In addition, a receiving space may be provided for the camera lens 18 by use of the recess region 113, so that an effect of stabilizing the camera lens 18 is achieved to prevent the camera lens 18 from being separated from the body portion 11 on one hand, and meanwhile, influence of excessive projection of the camera lens 18 on overall aesthetics of the functional module is also avoided.

In combination with FIG. 1, FIG. 2 and FIG. 4 to FIG. 6, in some exemplary embodiment, an edge 14 extends outwards from the side, distant from the body portion 11, of the sidewall portion 12. Therefore, when the decorative ring 10 is mounted, a relatively good limiting effect may be achieved by use of the edge 14, and meanwhile, dust may also be prevented from entering the mobile terminal from a gap between the decorative ring 10 and the shell 17. For example, when the decorative ring 10 is arranged at the shell 17 of the mobile terminal, the edge 14 abuts against an inner side of the shell 17, thereby locating the decorative ring 10 at the shell 17. The shell 17 may be a front shell of the mobile terminal, and may also be a rear shell of the mobile terminal. For example, in some implementation modes, the rear shell of the terminal device is provided with a mounting hole through the rear shell, and the side where the body portion 11 of the decorative ring 10 positioned, is arranged at the mounting hole in a penetration manner to make the edge 14 abut against a periphery of the mounting hole to limit the decorative ring 10 at the rear shell by use of edge 14 and achieve a relatively good sealing effect. In some implementation modes, the edge 14 may be adhered to the rear shell in an adhesion manner, and a sealing member such as a sealing ring or a sealing gasket may also be arranged at a position where the edge 14 is abutted against the rear shell to prevent water and dust.

Each technical characteristic of the embodiments may be freely combined. For brief description, not all possible combinations of each technical characteristic in the embodiments are described, but all the combinations of these technical characteristics shall fall within the scope recorded in the specification without conflicts.

The embodiments only express some implementation modes of the disclosure, and relatively specific and detailed descriptions are made thereto but should not thus be understood as limits to the scope of the patent application. It is to be pointed out that those of ordinary skill in the art may further make a plurality of transformations and improvements without departing from the concept of the disclosure and all of them fall within the scope of protection of the disclosure. Therefore, the scope of protection of the patent disclosure shall be subject to the appended claims.

What is claimed is:

1. A decorative ring, comprising a body portion, a sidewall portion and a light guide portion, wherein the sidewall portion encloses a peripheral side of the body portion to define an accommodating region, and the accommodating region is configured to accommodate a part of a camera module; the decorative ring has an inner face and an outer face opposite the inner face, the inner face defines the accommodating region, and the light guide portion enables light to transmit from a side where the inner face positioned to a side where the outer face positioned; the body portion or the sidewall portion is provided with a through hole, and the through hole is defined by hollowing the inner face and the outer face out; the through hole is filled with a part of the light guide portion.

2. The decorative ring of claim 1, wherein the body portion or the sidewall portion is provided with a through hole, and the through hole is defined by hollowing the inner face and the outer face out; the through hole is filled with a part of the light guide portion.

3. The decorative ring of claim 1, wherein the light guide portion is integrally formed at the body portion or the sidewall portion.

4. The decorative ring of claim 1, wherein the body portion is platy and has a first face and a second face opposite the first face, the first face forms a part of the inner face, and the second face forms a part of the outer face, the body portion is provided with a light transmission opening through the first face and the second face; the camera module comprises a camera assembly, the camera assembly comprises an inductive sensor and a lens group, and the light transmission opening enables external light to transmit through and get incident to the inductive sensor via the lens group.

5. The decorative ring of claim 1, comprising a camera lens, wherein the camera lens has an incident face and enables light to get incident to the camera assembly via the incident face, the body portion is provided with a recess region on a side where the second face positioned, and the camera lens is embedded into the recess region.

6. The decorative ring of claim 1, wherein the light guide portion is annular and extends along a peripheral side of the sidewall portion.

7. A functional module, comprising
a decorative ring comprising a body portion, a sidewall portion and a light guide portion, wherein the sidewall portion encloses a peripheral side of the body portion to define an accommodating region, and the accommodating region is configured to accommodate a part of a camera module; the decorative ring has an inner face and an outer face opposite the inner face, the inner face defines the accommodating region; and
a camera module arranged at the accommodating region;
wherein the light guide portion enables light to transmit from a side where the inner face positioned to a side where the outer face positioned; the body portion or the sidewall portion is provided with a through hole, and the through hole is defined by hollowing the inner face and the outer face out; the through hole is filled with a part of the light guide portion.

8. The functional module of claim 7, comprising a light source assembly, wherein the light source assembly is arranged on the side where the inner face positioned, and the light guide portion enables light emitted by the light source assembly to transmit to the side where the outer face positioned.

9. The functional module of claim 8, wherein the light source assembly comprises a circuit board and a Light-Emitting Diode (LED) lamp arranged on the circuit board, wherein the circuit board is arranged on a side having a larger distance to the body portion of the sidewall portion, and the LED lamp is opposite the light guide portion.

10. The functional module of claim 9, wherein the circuit board is annular and extends along a peripheral side of the sidewall portion, the circuit board is arranged surrounding the camera module, and a plurality of LED lamps is arranged in a surrounding direction of the circuit board.

11. The functional module of claim 7, wherein the body portion is platy and has a first face and a second face opposite the first face, the first face forms a part of the inner face, and the second face forms a part of the outer face, the body portion is provided with a light transmission opening through the first face and the second face;
the camera module comprises a camera assembly; the camera assembly comprises an inductive sensor and a lens group, and the light transmission opening enables external light to transmit through and get incident to the inductive sensor via the lens group.

12. The functional module of claim 11, comprising a camera lens, wherein the camera lens has an incident face and enables light to get incident to the camera assembly via the incident face, the body portion is provided with a recess region on a side where the second face positioned, and the camera lens is embedded into the recess region.

13. A mobile terminal, comprising
a functional module comprising
a decorative ring comprising a body portion, a sidewall portion and a light guide portion, wherein the sidewall portion encloses a peripheral side of the body portion to define an accommodating region, and the accommodating region is configured to accommodate a part of a camera module; the decorative ring has an inner face and an outer face opposite the inner face, the inner face defines the accommodating region: and a camera module arranged at the accommodating region; and a shell coupled to the functional module, and at least a part of the light guide portion exposes from the shell so as to enable light to emit from the mobile terminal via the light guide portion;

wherein the light guide portion enables light to transmit from a side where the inner face positioned to a side where the outer face positioned; the body portion or the sidewall portion is provided with a through hole, and the through hole is defined by hollowing the inner face and the outer face out; the through hole is filled with a part of the light guide portion.

14. The mobile terminal of claim 13, wherein the functional module comprises a light source assembly, wherein the light source assembly is arranged on the side where the inner face positioned, and the light guide portion enables light emitted by the light source assembly to transmit to the side where the outer face positioned.

15. The mobile terminal of claim 14, wherein the light source assembly comprises a circuit board and a Light-Emitting Diode (LED) lamp arranged on the circuit board, wherein the circuit board is arranged on a side having a larger distance to the body portion of the sidewall portion, and the LED lamp is opposite the light guide portion.

16. The mobile terminal of claim 15, wherein the circuit board is annular, and extends along a peripheral side of the sidewall portion, the circuit board is arranged surrounding the camera module, and a plurality of LED lamps is arranged in a surrounding direction of the circuit board.

17. The mobile terminal of claim 13, wherein the body portion or the sidewall portion is provided with a through hole, and the through hole is defined by hollowing the inner face and the outer face out; the through hole is filled with a part of the light guide portion.

18. The mobile terminal of claim 13, wherein the body portion is platy and has a first face and a second face opposite the first face, the first face forms a part of the inner face, and the second face forms a part of the outer face, the body portion is provided with a light transmission opening through the first face and the second face; the camera module comprises a camera assembly, the camera assembly comprises an inductive sensor and a lens group; and the light transmission opening enables external light to transmit through and get incident to the inductive sensor via the lens group.

19. The mobile terminal of claim 18, comprising a camera lens, wherein the camera lens has an incident face and enables light to get incident to the camera assembly via the incident face, the body portion is provided with a recess region on a side where the second face positioned, and the camera lens is embedded into the recess region.

* * * * *